United States Patent
Tien et al.

[11] Patent Number: 5,930,521
[45] Date of Patent: Jul. 27, 1999

[54] REORDER BUFFER ARCHITECTURE FOR ACCESSING PARTIAL WORD OPERANDS

[75] Inventors: Chien-Kou V. Tien; Ching-Tang Chang; George Shiang Jyh Lai, all of Taipei, Taiwan

[73] Assignee: Industrial Technology Research Institute, Taiwan

[21] Appl. No.: 08/834,312

[22] Filed: Apr. 15, 1997

Related U.S. Application Data

[51] Int. Cl.$^6$ .................................................. G06F 9/38
[52] U.S. Cl. ..................... 395/800.23; 395/394; 395/386
[58] Field of Search ............................... 395/800.23, 393, 395/394, 386

[56] References Cited

U.S. PATENT DOCUMENTS

| | | | |
|---|---|---|---|
| 4,992,938 | 2/1991 | Cocke et al. ............................. | 364/200 |
| 5,134,561 | 7/1992 | Liptay ..................................... | 395/425 |
| 5,345,569 | 9/1994 | Tran ........................................ | 395/375 |
| 5,446,912 | 8/1995 | Colwell et al. ...................... | 395/800.23 |
| 5,524,263 | 6/1996 | Griffith et al. ...................... | 395/800.23 |
| 5,590,392 | 12/1996 | Zuraski, Jr. et al. .............. | 395/800.23 |
| 5,778,245 | 7/1998 | Papworth et al. .................. | 395/800.23 |

OTHER PUBLICATIONS

Wallace et al. Design and Implementation of a 100MHz Reorder Buffer pp. 1–4 Aug. 1994.
Mike Johnson, *Prentice Hall 1991*; Superscalar Microprocessor Design. pp. 48–50; 92–94; 110; and 166–169.

*Primary Examiner*—Larry D. Donaghue
*Attorney, Agent, or Firm*—Proskauer Rose LLP

[57] ABSTRACT

A reorder buffer for an out-of-order issue/execute superscalar microprocessor is composed of a destination register unit, four data units, and a destination tag unit. The destination register and tag units are each made up of content addressable memory shift registers, while the data units are made up of random access memory shift registers which contain partial word operands. When an instruction is decoded, the destination register and tag units generate read and write match signals, respectively, for the data registers. The data registers are associated with corresponding lookup circuits and read/write driver cells. A valid bit is derived from a result byte input, and is used to selectively enable the lookup circuits and read/write driver cells to access the partial word operands in the data registers. Thus, the valid bit, in combination with the read and write match signals, provides the inventive reorder buffer with the ability to independently execute partial word operands in parallel.

8 Claims, 6 Drawing Sheets

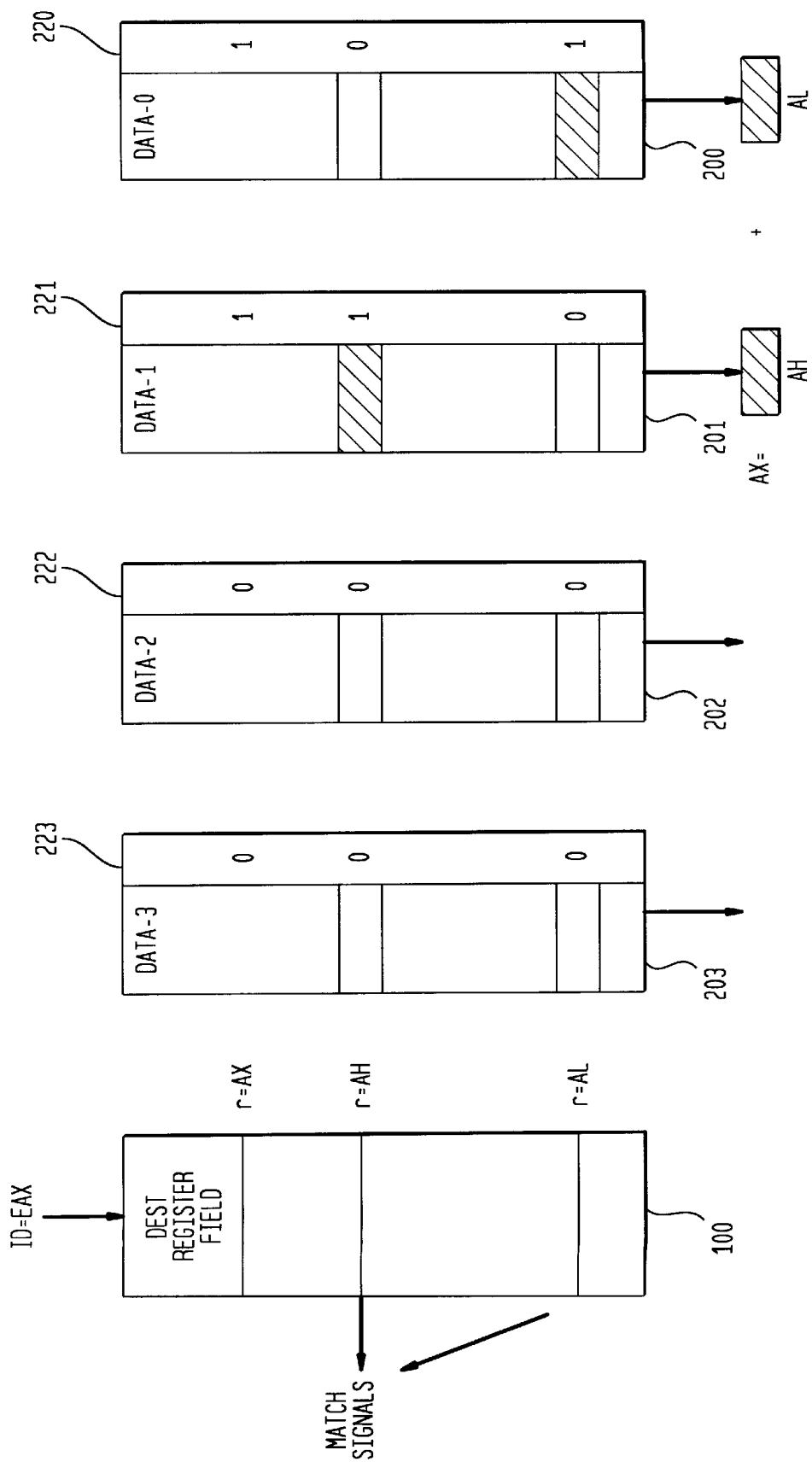

REORDER BUFFER ARCHITECTURE FOR ACCESSING PARTIAL WORD OPERANDS

FIELD OF THE INVENTION

The present invention relates to a data storage device within a microprocessor system. More specifically, the present invention relates to a reorder buffer within a superscalar microprocessor system, with the capability of accessing partial word operands.

BACKGROUND OF THE INVENTION

Many techniques have been developed in the art of microprocessor design to improve system performance by reducing program completion time; that is, by reducing the number of clock cycles required to perform the fetch, decode, and execute steps of a program instruction. One well-known technique uses a technique called pipelining. Pipelining is a technique analogous to an assembly line in which sequentially connected units operate in parallel to perform various steps of an instruction in an overlapping configuration thereby reducing the total cycle time.

As described in MIKE JOHNSON, SUPERSCALAR MICROPROCESSOR DESIGN (1991), the efficiency of such a "scalar" pipeline microprocessor, which executes one instruction at a time, can be improved further by expanding the pipeline stages so that respectively decode, fetch and/or execute steps are each simultaneously performed on multiple instructions. Johnson denotes this type of processor as a "superscalar" microprocessor. A second feature of superscalar processors is the ability to perform the steps of instruction completion out of the strict sequential order of the program. However, in order to correctly execute an instruction in parallel or using out-of-order instruction completion, the dependencies of each instruction on each other instruction must be taken into consideration. There are three types of instruction dependencies referred to as resource conflicts, procedural dependencies and data dependencies. Resource conflicts occur when two instructions executed in parallel contend to access the same resource, e.g., the system bus. A procedural dependency occurs where execution of a first instruction depends on the outcome of execution of a previous instruction, such as a branch instruction. Generally, it cannot be determined ahead of time whether or not the branch will be taken (although branch prediction algorithms can often predict the correct branch with a high accuracy). Data dependencies occur when the completion of a first instruction changes the value stored in a register or memory that is later accessed by a later completed second instruction.

Data depedency is a heavily studied topic in supescalar processor design. Data dependencies can be classified into three types referred to as "true data dependencies," "antidependencies" and "output data dependencies". An instruction which uses a value computed by a previous instruction has a "true" (or data) dependency on the previous instruction. An example of an output dependency is, in out-of-order completion, where two sequential instructions both assign the same register or memory location to different values and a later instruction uses the value stored in the register or memory location as an operand. The earlier instruction cannot complete after the later instruction or else the third instruction will have the wrong value. An example of an antidependency also occurs in out-of-order execution wherein a later instruction, executed out of order and before a previous instruction, may produce a value that destroys a value used by the previous instruction. As illustrations of true dependency, output dependency and antidependency, consider the following sequence of instructions:

(1) R3:=R3 op R5
(2) R4:=R3+1
(3) R3:=R5+1
(4) R7:=R3 op R4

Instruction (2) has a true dependency on instruction (1) since the value stored in R3, to be used as an operand in instruction (2), is determined by instruction (1). Instruction (3) has an antidependency on instruction (2) since instruction (3) modifies the contents of register R3. If instruction R3 is executed out of order and before instruction (2) then instruction (2) will use the wrong value stored in register R3 (in particular, the value as modified by instruction (3)). Instructions (1) and (3) have an output dependency. Instruction (1) cannot complete out of order and after instruction (3) because the resulting value, as determined by instruction (3), must be the last value stored in register R3, not the resulting value as determined by instruction (1), so that instruction (4) will execute on the correct operand value stored in register R3.

In order to resolve these dependencies/storage conflicts, a technique known in the art as register renaming can be implemented. According to register renaming, additional "substitution" registers are provided for purposes of reestablishing the correspondence between registers and values. Whenever, an executed instruction is intended to write a result value to a particularly named register, the processor typically dynamically allocates one of the substitute registers for storing the result instead of the particularly named register. A subsequently executed instruction that uses the particularly named register as an operand is provided instead the result value stored in the substitute register. For instance, consider the above sequence of instructions as implemented with register renaming:

(1) $R3_b := R3_a$ op $R5_a$
(2) $R4_b := R3_b + 1$
(3) $R3_a := R5_a + 1$
(4) $R7_b := R3_c$ op $R4_b$

As noted above, each assignment to a particular register, R3, R4, R5 or R7 creates a new instance of the register, e.g., $R3_a$, $R3_b$, or $R3_c$. Note that instruction (2), which uses the value stored in register R3 as an operand, is provided the value stored in register $R3_b$, namely, the value stored in the substitute register provided for the instruction (1), and not the value of the substitute register $R3_a$ provided for storing the result of the instruction (3). Likewise, instruction (4) is provided the value of the substitute register $R3_c$ (the assignment of which is not shown), and not the value of the substitute register $R3_a$ (provided for storing the result of instruction (3)) or the substitute register $R3_b$ (provided for storing the result of instruction (1)).

To implement register renaming, a superscalar microprocessor system may incorporate a reorder buffer, which contains a number of storage locations for entries that are dynamically allocated to instruction results. When an instruction is decoded, its result value is assigned a reorder buffer storage location, and its destination register number is associated with this location. Thus, the destination register is "renamed" to the reorder buffer location. A tag, or temporary hardware identifier, is created to identify the result, and the tag is also stored in the assigned reorder buffer storage location. When a subsequent instruction refers to the renamed destination register, the instruction obtains the value stored in the reorder buffer, or the tag for this value, if the value has not yet been computed.

The reorder buffer in a superscalar microprocessor architecture is typically included within a scheduling unit, which will also contain reservation stations and a register file. A reservation station is a buffer assigned to a particular functional unit (a device that executes instructions such as an arithmetic logic unit or ALU, floating point unit or FPU, etc.), which temporarily stores decoded instructions pending execution in its respective functional unit. The reservation stations contain the logic circuitry required to eliminate resource conflicts, as may occur when more than one instruction requires the same resource at the same time. The register file receives completed result updates in proper program sequence from the reorder buffer, which contains the renamed destination registers as described above.

Certain X86 architecture microprocessors have 32-bit registers that can be accessed in whole or in part. For example, the 386 has a register named EAX with 32 bits. The least significant 16 bits may be separately accessed as a 16 bit register named AX. An access (read or write) to this register only affects the 16 least significant bits of the EAX register. Likewise, the 8 most significant bits of the AX register may be separately accessed as an 8 bit register called AH and the 8 least significant bits of the AX register may be separately accessed as an 8 bit register called AL.

The prior art discloses a number of register renaming and in-order result write-back schemes. However, all of such prior art techniques assume that all register accesses are to physically distinct registers, with no capability for partial word (i.e., 16-bit or 8-bit) accessing.

U.S. Pat. No. 4,992,938 discloses a register renaming system which eliminates output dependencies and allows computations aliased to the same register to proceed in parallel. This technique uses a Mapping Table, a Pending Target Queue, a Store Queue, and a Free List, to map register numbers to a set of registers within the system.

U.S. Pat. No. 5,134,561 discloses a renaming system which identifies particular addressable registers. An Array Control List and Decode Register Assignment List provide register renamings. A back-up register Assignment List preserves old information while out-of-sequence and conditional branch instructions are executed.

U.S. Pat. No. 5,345,569 discloses a reorder buffer which employs pointers to resolve data dependencies.

As stated above, each of the above described prior art patents uses a register renaming technique which only accesses complete register words. Therefore, there is no partial word accessing capability in the prior art for result writes and operand reads. As such, when partial register accesses are performed, no out-of-order or parallel instruction completion techniques can be used to speed up such instructions. Furthermore, other instructions which fully access such registers (i.e., the EAX register) that are sequentially near the partial word access instructions may be delayed to ensure that none of the above data dependency constraints are violated. Hence, the performance efficiency of the prior art is limited, since there is no capability for parallel execution of partial word operands.

Accordingly, it is an object of the present invention to improve the instruction completion efficiency of an out-of-order issue/execute superscalar microprocessor by providing a reorder buffer architecture and method which uses partial word accessing to enhance parallel instruction execution.

SUMMARY OF THE INVENTION

In accordance with an illustrative embodiment of the present invention, a reorder buffer contains a content addressable memory (CAM) destination register unit, a CAM destination tag unit, and four random access memory (RAM) data register units. Each of the RAM data register units is made up of byte-size data registers, which are configured to store partial word operands for independent accessing. Each data register is associated with a corresponding lookup circuit and driver cell. The lookup circuits and driver cells are selectively enabled by valid bits to access a desired partial word operand in the data registers, in coincidence with read or write match signals. Decoded instruction destination identifiers are compared to destination registers in the destination register unit to generate the read match signal, and are also compared with result tags in the destination tag unit to generate the write match signal. The valid bit is derived from a result byte intended for modification at log in, and is routed to the appropriate lookup circuit and driver cell to select the desired byte position for accessing a partial word operand. As a result, partial word operands can be accessed from different data registers for independent execution in parallel, thus improving the instruction completion efficiency of a superscalar microprocessor system.

An illustrative embodiment of the present invention is more fully described below in conjunction with the following drawings.

BRIEF DESCRIPTION OF THE DRAWINGS

FIG. 8 illustrates the inventive parallel execution of the reorder buffer.

DETAILED DESCRIPTION OF THE INVENTION

Figure 1:
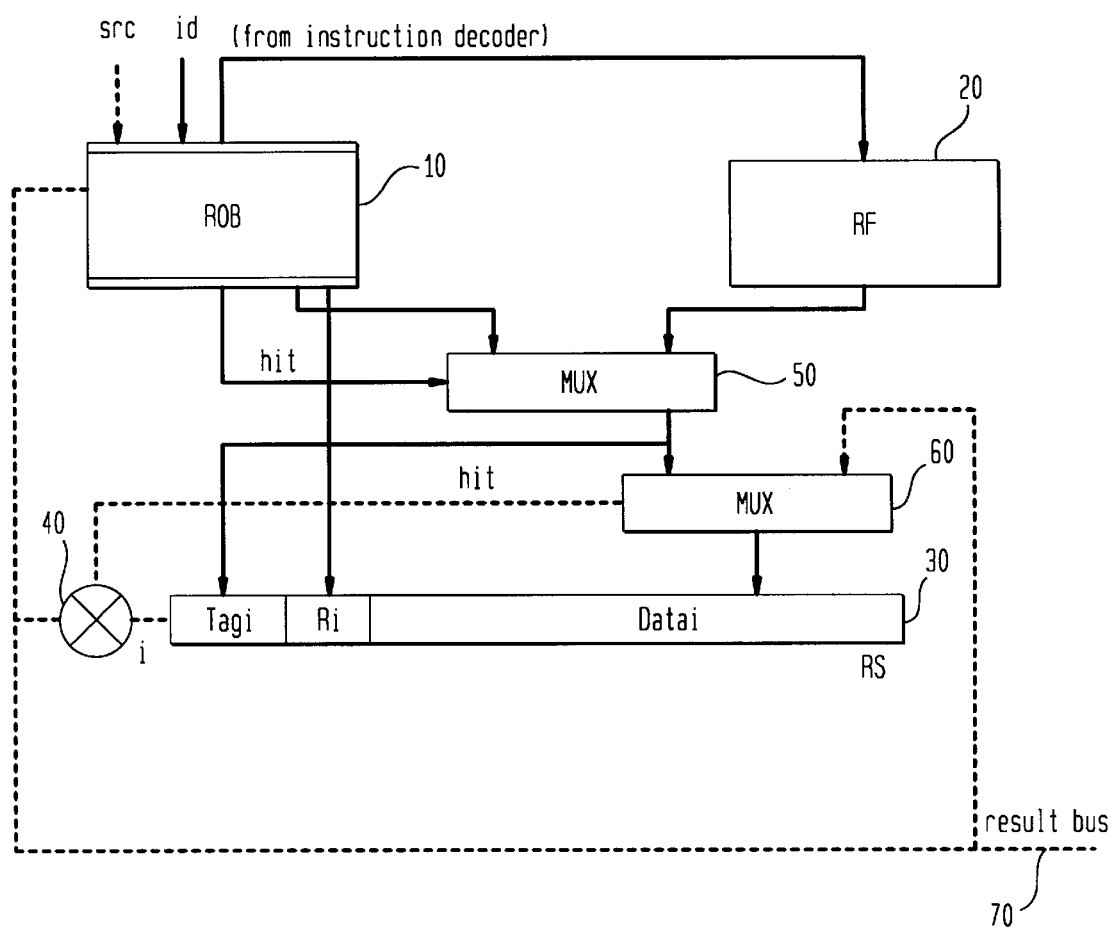
FIG. 1 is a block diagram of a scheduling unit, embodying the present invention.

As stated previously, a superscalar microprocessor reorder buffer is typically included within a scheduling unit. According to one system embodiment, as shown in FIG. 1, an illustrative scheduling unit 1 includes a reorder buffer (ROB) 10, a register file (RF) 20, and a reservation station (RS) 30. ROB 10 allocates decoded instruction inputs to register entries at the top of its register field, and, after execution, writes the completed instructions into RF 20, as long as there are no exceptions or mispredictions associated with the completed instructions.

At instruction decode, a portion of the available source operands may come from either ROB 10 or RF 20. Those operands not found in either ROB 10 or RF 20 receive tags from ROB 10 via MUX 50 for corresponding operands in RS 30. When a result appears on result bus 70, the tag of each operand in RS 30 is compared with the result tag on result bus 70, via comparator 40, for a match. If there is a match, the operand in RS 30 obtains the corresponding value on the result bus via MUX 60. RS 30 will hold a decoded instruction until it is free of dependencies, and until its associated functional unit (not shown) is free to execute the instruction.

Figure 2:
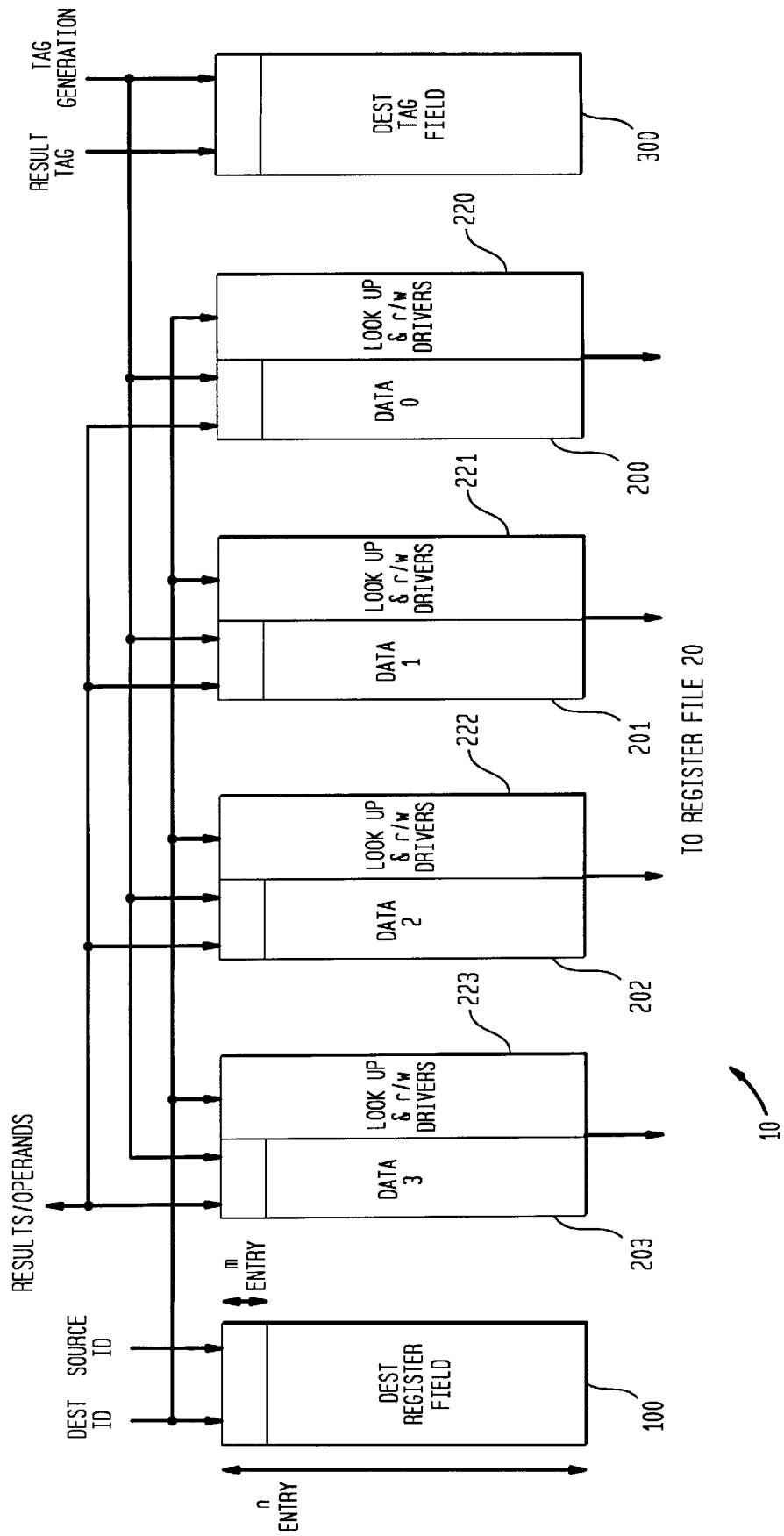
FIG. 2 is a block diagram of the inventive reorder buffer.

An illustrative embodiment of the inventive reorder buffer (ROB) 10 is depicted in FIG. 2. ROB 10 includes a destination register unit 100, four data units 200–203, which are each associated with corresponding lookup and read/write line driver arrays 220–223, and a destination tag unit 300. Data units 200–203 are made up of random access memory (RAM) shift registers. ROB 10 is configured to have n identical entry rows, with m entries as a block, for a total of n/m blocks. When the block at the top entry position of ROB 10 accepts new instructions, ROB 10 shifts one block, and the block at the bottom entry position commits its results into RF 20.

In the inventive reorder buffer architecture, the storage location for storing register result values is partitioned into multiple partitions. The granularity of each partition pertains to the kinds of permissible partial register accesses supported by the type of processor used. For instance, in x86 compatible processors, the storage locations must partition the 32 bit storage locations into a 16 bit most significant bit partition and two lesser significant 8 bit partitions. For the sake of convenience, the present invention is described so that the register result value storage locations are partitioned into four byte-sized (8-bit) partitions.

An indicator, in the form of a bit, is associated with each partition. The indicator indicates whether or not the partition (i.e., portion of the respective "renamed" register, to which the indicator corresponds) is to be updated by the result produced for the register to which the partition corresponds. For instance, suppose a register result storage location corresponds to the register AH. Then, each indicator for the most, second most and least significant bytes of the register result storage location (bytes 0, 1 and 3, in order of most to least significant) will indicate that their respective partitions should not be updated by the result produced for AH, but the indicator for the second least significant byte (byte 2) will indicate that its respective partition should be updated by the result produced for AH.

Consider now the situation of the following code segment:

AL:=AL+1     (1)

AH:=AH+2     (2)

AX:=AX+3     (3)

The registers AL and AH are treated as independent registers. Each is provided with a separate storage location in the reorder buffer with appropriate indicator bits set. Therefore, each reorder buffer entry gets its own unique tag. When a result issues on the result bus for one of the registers, e.g., register AL, match logic is provided which, in response to the indicator bits, only changes the least significant byte (byte 3) of the value stored in the reorder buffer for register AL. Likewise for AH, only the second least significant byte (byte 2) of the value stored in the reorder buffer for AH is changed. In the case of AX, both the second least, and least significant bytes (bytes 2 and 3) of the value stored in the reorder buffer for AX are changed.

Figure 3:
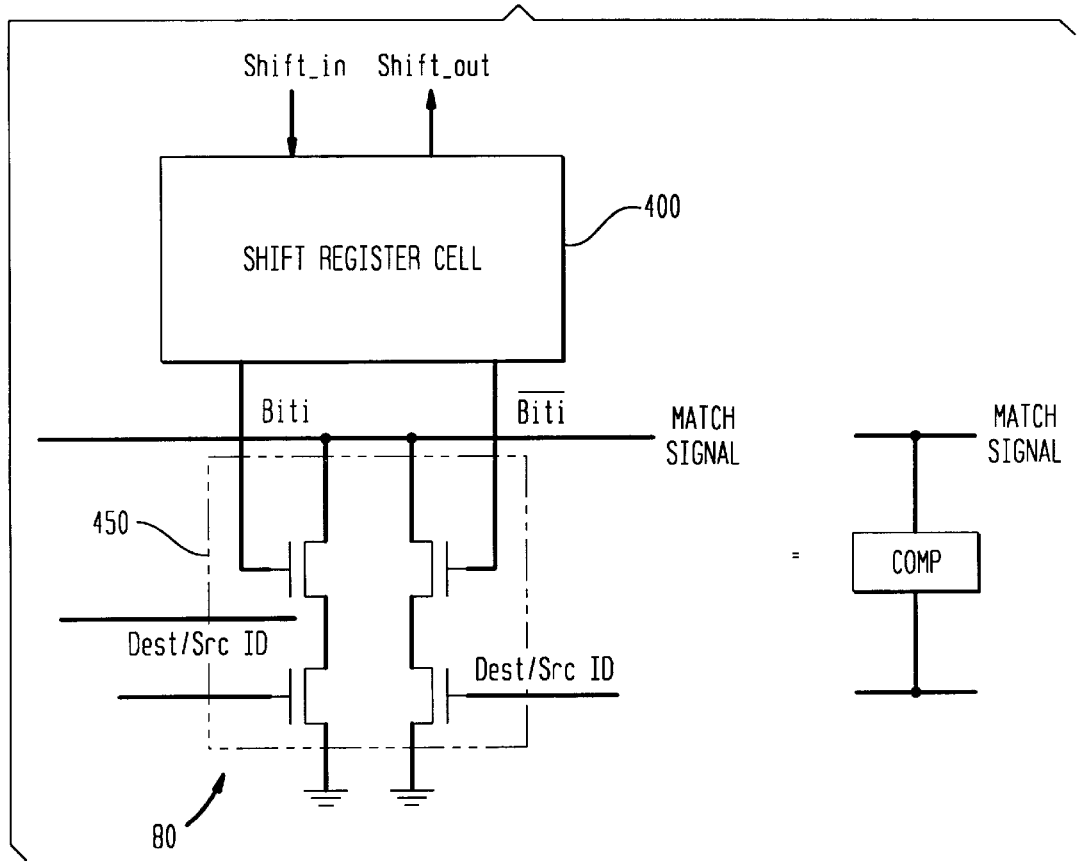
FIG. 3 is a block diagram of a CAM cell.

Destination register unit 100 and destination tag unit 300 are each made up of content addressable memory (CAM) shift registers. A shift register CAM cell 80, for destination register unit 100 or destination tag unit 300, is shown in block form in FIG. 3. CAM cell 80 is used for comparing destination identifiers to the destination registers in destination unit 100, to perform a bit-wise match, and to generate a match signal for operand retrieval. Similarly, CAM cell 80 is also used for comparing result tags to the tag registers in destination tag unit 300, and to generate a match signal for writing results into data units 200–203. As shown in FIG. 3, CAM cell 80 determines which destination entries (or tag entries) match for reading or writing. CAM cell 80 includes a shift register cell 400 coupled to a four-transistor comparator circuit 450. All the comparators in a match line are connected in a wired-OR configuration with a pull-up transistor (not shown) to charge the match line. If a destination register or tag register matches the source identifier, the match signal remains logic high. Otherwise, it is driven to a logic zero.

Figure 4:
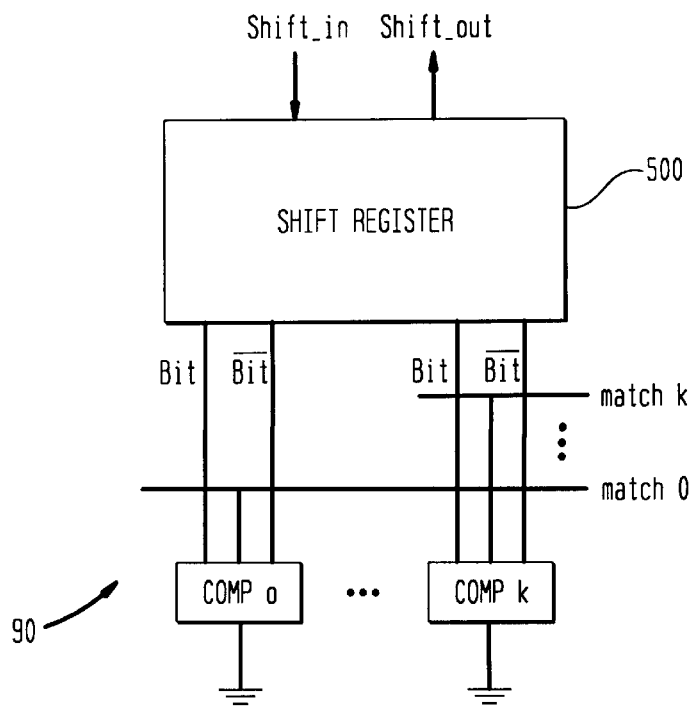
FIG. 4 is a block diagram of a multiple-port CAM cell.

In the illustrative embodiment of the inventive reorder buffer, parallel matching is required for decoding four instructions, writing back four results, and retiring four instructions to RF 20 (FIG. 2) at the same time. To this end, a multiple-port CAM cell 90 can be configured, as shown in FIG. 4, using multiple comparators (0-k) combined with corresponding match lines and a shift register 500.

Figure 5:
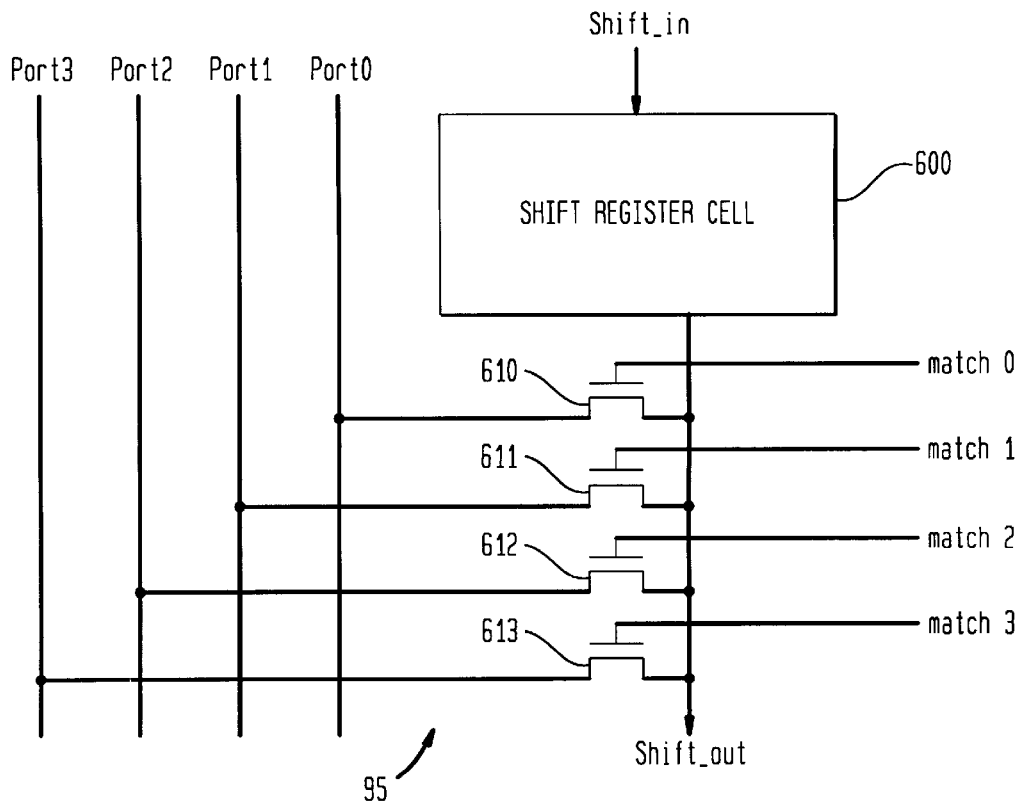
FIG. 5 is a block diagram of a 4-port data cell.

Similarly, a four-port RAM data cell 95 is illustrated in FIG. 5, made up of a shift register cell 600 coupled to pass transistors 610–613, which are gated by corresponding match signals 0–4.

Figure 6:
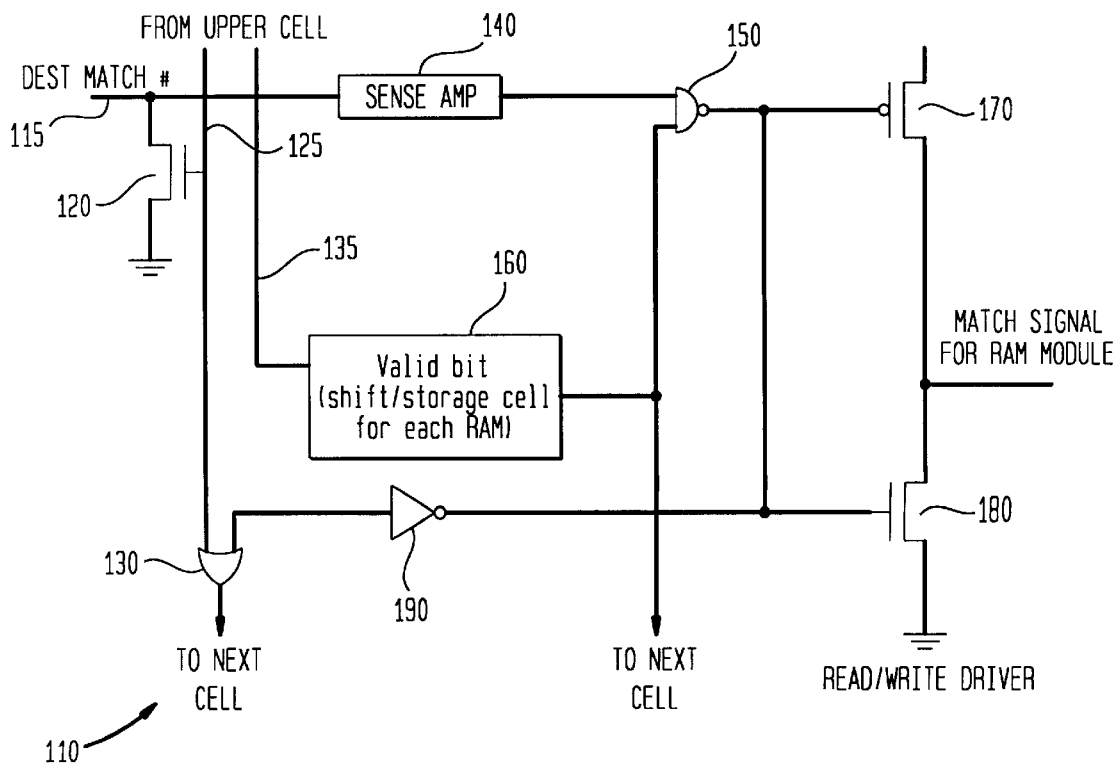
FIG. 6 is a block diagram of a look-up circuit and driver cell.

Referring again to reorder buffer (ROB) 10 in FIG. 2, in order to write results into data units 200–203, one entry row of CAM cells within destination tag unit 300 must match a destination identifier. In order to write a partial word (e.g., an 8-bit subset byte), so as to enable partial word accessing, the match signals to the appropriate RAM modules within RAM data fields 200–203 need to be charged or discharged, depending on which module (byte) locations the results are to be written to. This is accomplished by means of a valid bit enable signal, equivalent to the previously described indicator bit, which is selectively allocated to an appropriate lookup circuit and driver cell, as depicted in FIG. 6. The valid bit enabling signals are set or cleared in accordance with the instruction result bytes that are intended for modification at log in.

FIG. 6 shows a schematic representing a lookup circuit and driver cell 110. Transistor 120 acts as a comparator between a result tag (or source identifier) on signal line 125 and a destination register signal on line 115 to determine a match. When a match occurs, all destination match signals below this entry will be discharged. Sense amplifier 140 also receives the destination register signal and outputs a corresponding logic signal to nand gate 150. At the same time, a result byte signal on line 135 sets or clears a valid bit in shift/storage cell 160, which is also inputted to nand gate 150. The output signal from nand gate 150 is connected to transistors 170 and 180 to generate a match signal for the corresponding RAM module. The nand gate 150 output signal is also routed to or gate 130 via inverter 190. The signal on line 125 is connected directly to or gate 130 for outputting to the next cell. The valid bit output from cell 160 is also outputted to the next cell. In this manner, a valid/enable signal is combined with a destination match signal to generate a partial word (byte location) match signal for a RAM module.

During operand reads, there may be more than one CAM destination entry row in destination register unit 100 (FIG. 2) with a source identifier match. In this case, the source identifier will match the most recent destination tag, which is located at the top entry row of the matching destination registers. All other matching entries will be discarded, as described previously.

Figure 7:
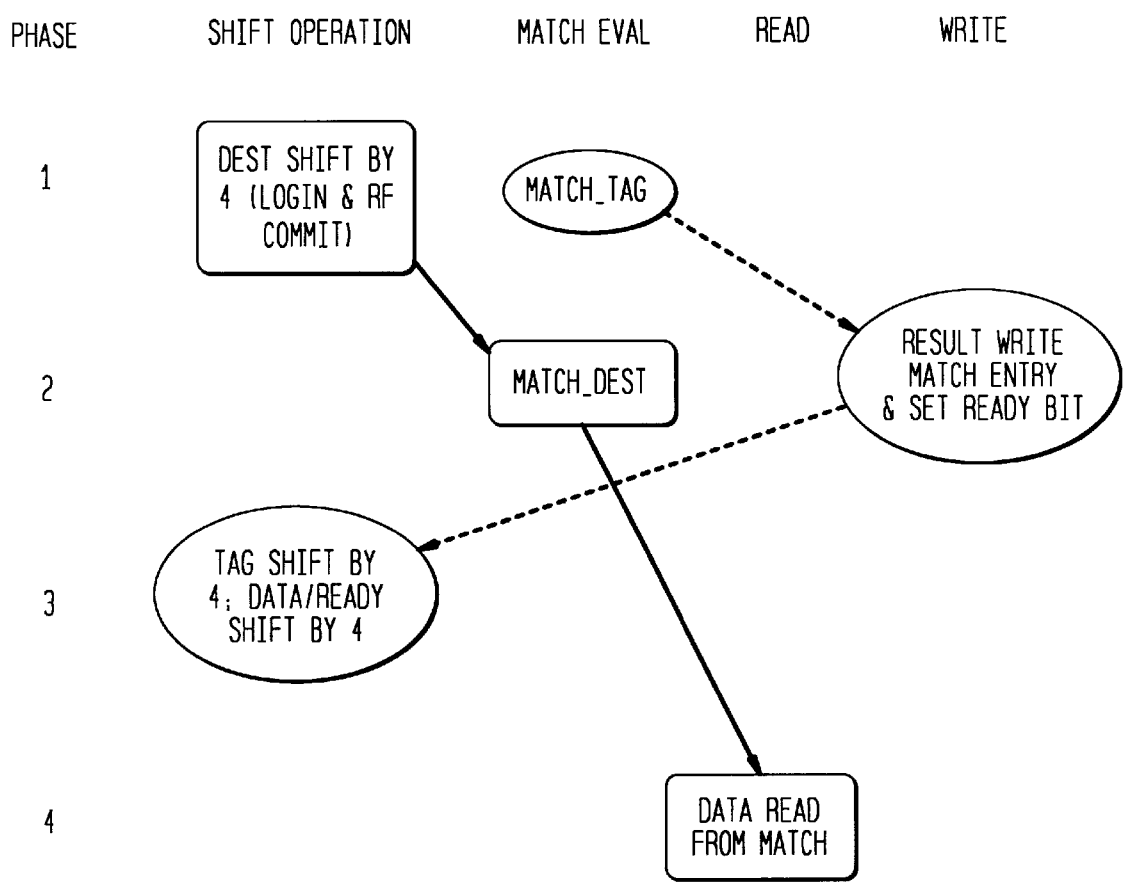
FIG. 7 depicts the four clock phases of the reorder buffer read/write operation.

In the illustrated embodiment, a four-phase clock is used to control the ROB 10 operational sequence. FIG. 7 illustrates the four pipeline stages of shift, match, read, and write operations during each clock phase, with reference to the hardware configuration of FIG. 2. In the first phase, destination register unit 100 shifts by one block, where one block equals four program instructions, thereby retiring register information from ROB 10, and creating space for new instructions. Also in the first phase, a destination identifier is shifted in and matched with a result tag for result write-back. In the second phase, result values are written into data units 200–203, and destination unit 100 is matched with the source identifiers for operand retrieval, to be used for reading out in the fourth phase. In the third phase, data units 200–203 and destination tag unit 300 are shifted by four, so that the result values, result tag, and destination identifier for an entry are aligned. In the fourth phase, the result values (data/tag) are read out from data units 200–203. Thus, four shifts are required, so that four instructions can be decoded, four results can be written back, and four instructions can be retired to RF 20 at a time.

To illustrate the partial word accessing capability of the inventive reorder buffer, the following code sequence, in conjunction with FIG. 8, is used as an example:

$$AL:=AL+3 \quad (1)$$

$$AH:=AH+2 \quad (2)$$

$$AX:=AX+1 \quad (3)$$

where AL and AH are low and high 8-bit bytes (partial word operands), respectively, of a 16-bit source operand AX. In a microprocessor architecture with no partial word accessing capability, the second instruction could not execute until the first instruction is completed, since both partial words are stored in the same register entry. For the same reason, the third instruction could not execute until the second instruction is completed. As shown in FIG. 8, however, the inventive reorder buffer (ROB 10) resolves this dependency between instructions by means of accessing partial word operands.

The first instruction logs in with a pattern 0001, since its result destination is AL, the least significant byte of a 32-bit word. The most recently stored value or tag of AL is retrieved, based on the register identifier "EAX" and the indicator 0001. Similarly, the second instruction logs in with result destination AH, with the pattern 0010 as the indicator for the next higher significant byte. Then, the most recently stored value or tag of AH is retrieved. The third instruction logs in with result destination AX, representing AH concatenated by AL in a 16-bit word, with pattern 0011 as the indicator. In order for the third instruction to retrieve the operand AX, it must access both AH and AL, which are each stored in different registers in ROB 10. This is accomplished by selectively enabling the corresponding lookup circuit and drive cell in the read/write drive arrays 220–223, of data units 200–203, by means of the appropriate valid bits in combination with destination match signals, as previously described. Thus, the source operand AX can read its partial word operands AH and AL from different registers in ROB 10 data units 200–203.

In short, a reorder buffer is disclosed with partial word accessing capability. This improves the performance of a superscalar microprocessor by increasing its parallel instruction efficiency. The above described embodiments of the invention are intended to be illustrative only. Numerous alternative embodiments may be devised by those skilled in the art without departing from the spirit and scope of the following claims.

We claim:

1. A reorder buffer storage device for accessing partial word operands in a superscalar microprocessor circuit, comprising:

a destination register unit, containing a plurality of content addressable memory (CAM) destination registers, for receiving instructions from an instruction decoder and for comparing destination identifiers from said instructions to said destination registers to obtain a read match signal, a destination tag unit, containing a plurality of CAM destination tag registers, for receiving result tags from said microprocessor circuit, and for comparing said result tags to said destination tag registers to obtain a write match signal, a plurality of random access memory (RAM) data register units for receiving said read and write match signals, each of said data register units containing a plurality of RAM data registers, said RAM data registers corresponding in bit length to said partial word operands to be accessed, said RAM data registers further comprising associated lookup circuits and driver cells, wherein said lookup circuits and driver cells are selectively enabled by a valid bit from said instructions, in combination with said read and write match signals, in order to access said partial word operands in said RAM data registers.

2. The reorder buffer of claim 1 wherein each of said CAM destination registers and said CAM destination tag registers comprises a shift/memory cell coupled to a transistor comparator circuit.

3. The reorder buffer of claim 1 wherein each of said CAM destination registers and said CAM destination tag registers comprises a multiple-port CAM cell array.

4. The reorder buffer of claim 1 wherein each of said RAM data registers comprises a shift register cell coupled to a gated pass transistor.

5. The reorder buffer of claim 1 wherein each of said RAM data registers comprises a multiple-port data cell array.

6. The reorder buffer of claim 1 wherein a multi-phase clock controls a plurality of pipeline stages to implement shift, match, read, and write operations required for said accessing of said partial word operands.

7. The reorder buffer of claim 1 wherein said partial word operand access allows for independent parallel execution of said partial word operands.

8. A method for accessing partial word operands stored in a superscalar microprocessor reorder buffer, comprising the steps of:

receiving decoded instructions into said reorder buffer, matching source identifiers from said instructions with destination registers in said reorder buffer to obtain a read match signal, receiving result tags into said reorder buffer, matching said result tags with destination tag registers in said reorder buffer to obtain a write match signal, receiving said read and write match signals into data registers in said reorder buffer, each of said data registers corresponding in bit length to said partial word operands to be accessed, and having associated lookup circuits and driver cells, receiving a selectively enabling valid bit in said lookup circuits and driver cells from said instructions, wherein said valid bit, in combination with said read and write match signals, selectively enables said lookup circuits and driver cells to access said partial word operands in said data registers in said reorder buffer.

* * * * *